United States Patent Office 2,773,071
Patented Dec. 4, 1956

2,773,071

ANTHRAQUINONE DYES

Roy A. Pizzarello, Mount Vernon, and Boris Gutoff, Far Rockaway, N. Y., assignors to Interchemical Corporation, New York, N. Y., a corporation of Ohio No Drawing. Application January 26, 1954,
Serial No. 406,332

6 Claims. (Cl. 260—380)

The present invention relates to new dyes; more particularly the invention relates to dyes which are derivatives of anthraquinone and which dye cellulose acetate and synthetic textiles, such as Dacron, in bright red shades.

Our new dyes can be represented as having the following structural formula:

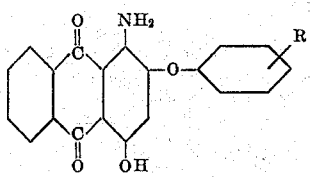

where R is hydroxyl, an alkoxy group containing one to four carbon atoms, an hydroxyalkyl group containing one to four carbon atoms, or an hydroxyalkoxy group containing two to four carbon atoms. These new dyes are conveniently prepared by condensing 1-amino-2-halo-4-hydroxy anthraquinone with alkali metal salt of a substituted phenol having the formula:

where R has the significance previously assigned to it. Typical examples of such phenols include hydroquinone, resorcinol, hydroquinone monomethyl ether, resorcinol monoethyl ether, m-hydroxy benzyl alcohol, β-(p-hydroxyphenyl) ethyl alcohol, m-(β-hydroxyethoxy) phenol, p-(β-hydroxyethoxy) phenol, and monoglycerol ether of resorcinol.

Cellulose acetate dyes are known which are derived from 1-amino-2-halo-4-hydroxy anthraquinone or 1,4-diamino-2-halo-anthraquinone by replacing the halogen atom with an alkoxy group. These dyes generally have poor gas fading properties and do not have very good affinity for cellulose acetate. Also, these known dyes, especially those derived from 1-amino-2-halo-4-hydroxy anthraquinone, tend to sublime, i. e. their color is transferable to white backgrounds or to other fabrics of a different color, when the dyed fabric is heated as in laundering and ironing. The new dyes of the present invention overcome these bad characteristics of these known red shade anthraquinone dyes.

The following examples will further illustrate the invention.

Example 1 m-Hydroxy benzyl alcohol (5 grams), potassium carbonate (0.4 gram) and 1-amino-2-bromo-4-hydroxy anthraquinone (0.96 grams) was heated to 175°–185° C. for 75 minutes. Then 40 ml. of 25% aqueous caustic soda solution was added and then the mass was drowned in 300 ml. of water, filtered and washed, obtaining 0.42 grams of impure dyestuff. The dyestuff was purified by passing a benzene solution of the crude material over a column of magnesium carbonate. Analysis of the purified dye showed a nitrogen content of 3.73% while the nitrogen content calculated for 1-amino-2-(m-hydroxymethyl phenoxy)-4-hydroxy anthraquinone is 3.88%. This dye has the following formula:

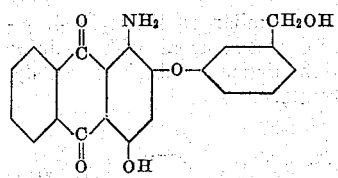

The dye, when dispersed in conventional manner, had good affinity for, and dyed cellulose acetate fibers a bright red shade of good resistance to light and gas fading. The dye does not sublime.

Example 2

1-amino-2-bromo-4-hydroxy anthraquinone (32.16 grams), hydroquinone (96.14 grams) and potassium carbonate (13.8 grams) were heated to 180° C. and kept at that temperature for two hours. Water (200 grams) was added to the cooled reaction mass, then the mixture was heated up to near the boil, filtered hot, and the impure solid dyestuff dried. The yield of dye was 38.77 grams. It dyed cellulose acetate a bright, non-subliming red shade of good resistance to light and gas fading. It dyed Dacron fibers (polyester fiber made from terephthalic acid and glycol) fibers a bright, bluish red shade of good fastness properties and was non-subliming. This dye has the probable formula:

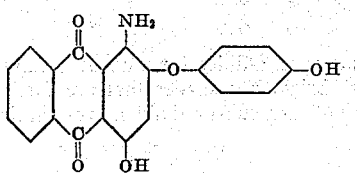

Example 3

Resorcinol (180 grams), 1-amino-2-bromo-4-hydroxy anthraquinone (31.9 grams), and potassium carbonate (16 grams) were heated to 175° C. and kept at 175 to 180° for 90 minutes. The reaction mixture was then dropped into two liters of water, boiled, and filtered. The impure dyestuff was purified by dissolving it in hot dilute sodium carbonate solution, filtering the solution, reprecipitating the dyestuff by neutralizing the filtrate, and filtering off the reprecipitated product. The recovered dye dyed cellulose acetate fibers and Dacron fibers bright red shades. This dye has the probable formula:

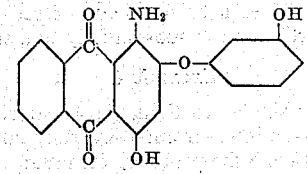

Example 4 m-(β-Hydroxyethoxy) phenol (5 grams), potassium carbonate (0.4 gram) and 1-amino-2-bromo-4-hydroxy anthraquinone (0.96 gram) were heated at 175–180° C. for 75 minutes. Then 40 ml. of 25% aqueous caustic soda solution was added and the mixture was drowned in 300 ml. of water, filtered and dried. The crude dye was purified in a manner similar to that of Example 1. The dye has good affinity for, and dyes cellulose acetate and Dacron fibers a very bright and fast red shade and is substantially non-subliming. This dye has the probable formula:

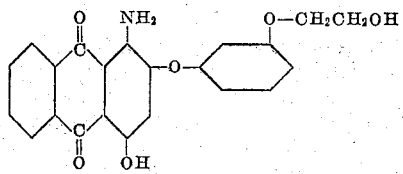

Example 5

In a manner similar to Example 4, p-(β-hydroxyethoxy)-phenol was reacted with 1-amino-2-bromo-4-hydroxy anthraquinone to obtain a red dye having the probable formula:

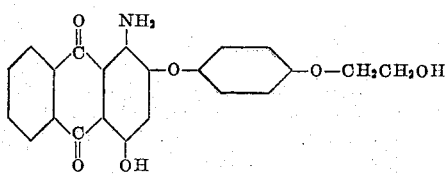

This dye has good affinity for, and dyes cellulose acetate and Dacron fibers red shades that are non-subliming, and have good fastness properties.

Example 6

In a manner similar to Example 4, the monomethyl ether of hydroquinone was reacted with 1-amino-2-bromo-4-hydroxy anthraquinone to obtain a dye having the probable formula:

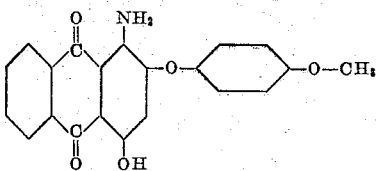

This dye has good affinity for, and dyes cellulose acetate and Dacron bright red shades that are fast to light and gas fading and are substantially non-subliming.

Example 7

In a manner similar to Example 4, the monoglycerol ether of resorcinol was reacted with 1-amino-2-bromo-4-hydroxy anthraquinone to give a dye having the probable formula:

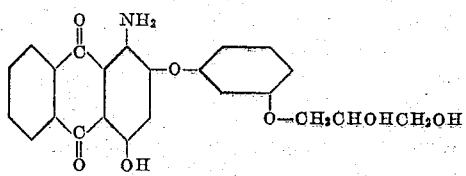

This dye has good affinity for cellulose acetate and Dacron fibers and dyes a bright shade of red having good fastness properties and is substantially non-subliming.

Example 8

In a manner similar to Example 4, catechol was condensed with 1-amino-2-bromo-4-hydroxy anthraquinone to give a dye having the probable formula:

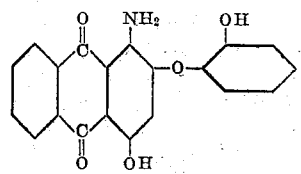

This dye has good affinity for cellulose acetate and dyes a bright shade of red having good gas and light fastness and is substantially non-subliming.

Example 9

In a manner similar to Example 4, the monomethyl ether of resorcinol was condensed with 1-amino-2-bromo-4-hydroxy anthraquinone to give a dye having the probable formula:

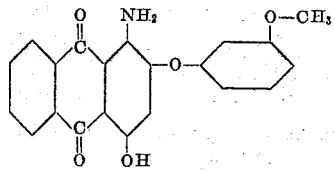

This dye has good affinity for cellulose acetate and dyes a bright shade of red having good gas and light fasteness. It has better washfastness than the dye obtained in Example 3 and is substantially non-subliming.

Example 10

In a manner similar to Example 4, o-(β-hydroxyethoxy) phenol was condensed with 1-amino-2-bromo-4-hydroxy anthraquinone to give a dye having the probable formula:

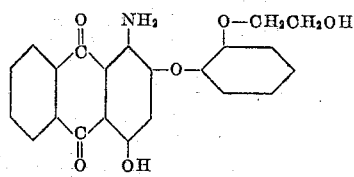

We claim:

1. A new red dye having the structural formula:

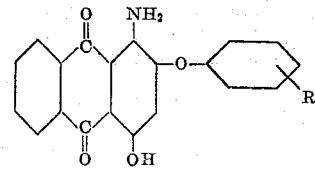

wherein R is a member of group consisting of hydroxyl group, an alkoxy group containing one to four carbon atoms, an hydroxy alkyl group containing one to four carbon atoms, and an hydroxyalkoxy group containing two to four carbon atoms.

2. A new red dye having the formula:

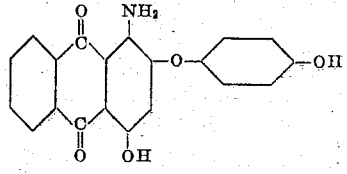

3. A new red dye having the formula:

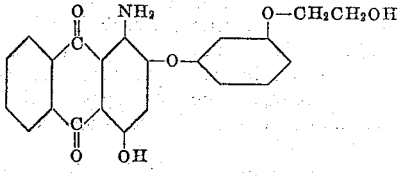

4. A new red dye having the formula:

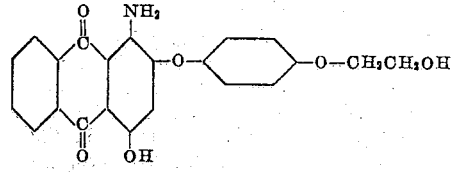

5. A new red dye having the formula:
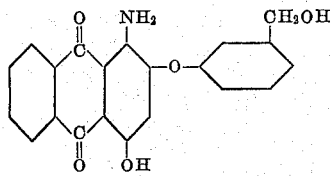
6. A new red dye having the formula:
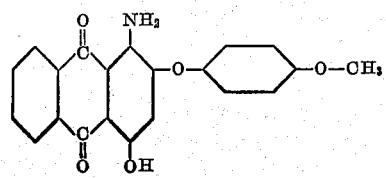
References Cited in the file of this patent
UNITED STATES PATENTS
| 1,964,971 | Albrecht et al. | July 3, 1934 |
| 2,101,910 | Lodge et al. | Dec. 14, 1937 |
| 2,353,108 | Wuertz et al. | July 14, 1944 |
| 2,517,935 | Singer et al. | Aug. 8, 1950 |
FOREIGN PATENTS
| 558,433 | Great Britain | Jan. 5, 1944 |
OTHER REFERENCES
Georgievics-Dye Chemistry, pages 6, 7 (1920).